Patented Oct. 18, 1938

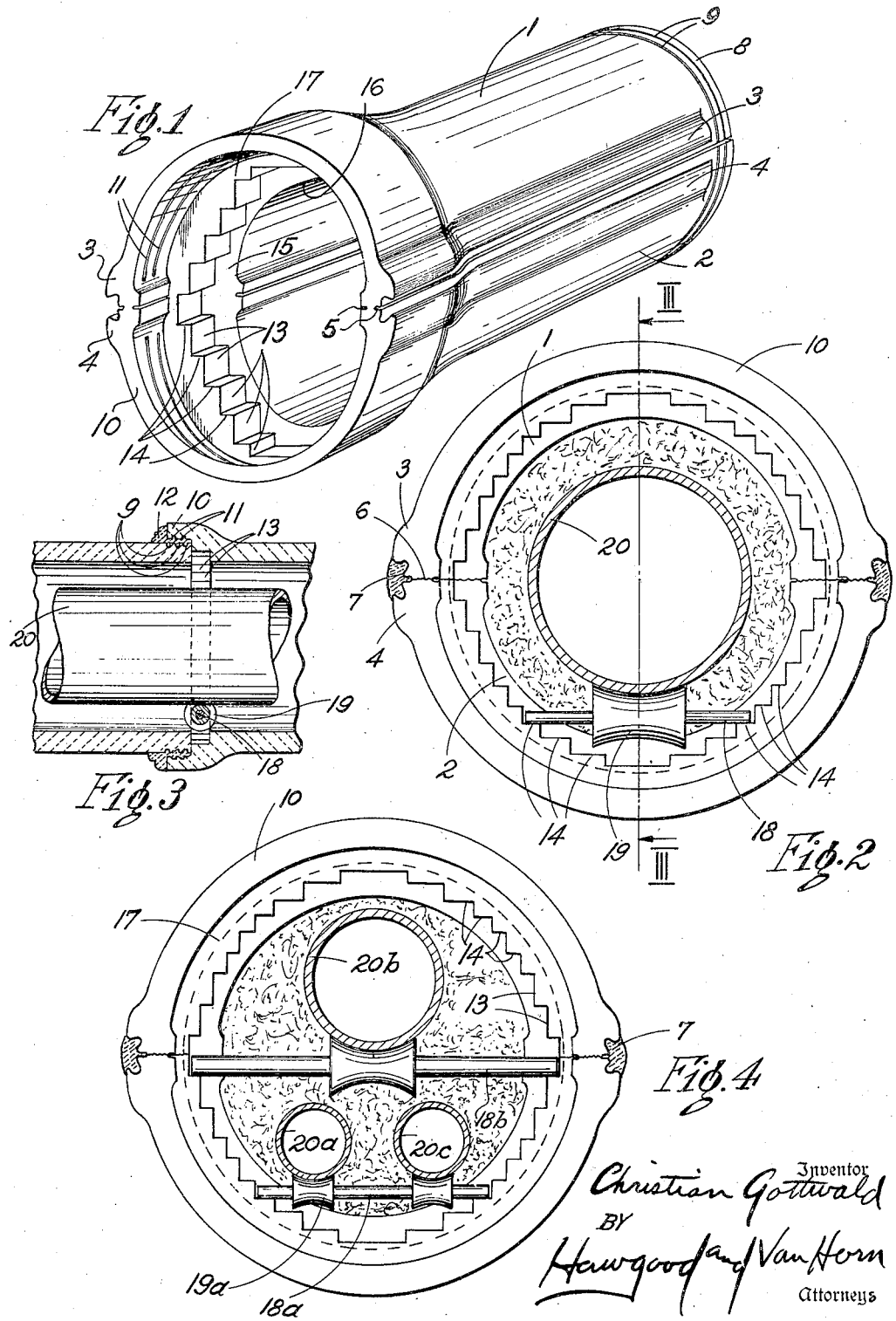

2,133,731

UNITED STATES PATENT OFFICE 2,133,731

CONDUIT

Christian Gottwald, Cleveland Heights, Ohio, assignor to The Ric-wiL Company, Cleveland, Ohio, a corporation of Ohio Application June 26, 1936, Serial No. 87,412

3 Claims. (Cl. 138—48)

This invention relates to conduits and similar structures, and is particularly adapted to conduits used to enclose pipe lines for conveying fluids.

An object of the invention is to provide an improved conduit which may be very effectively sealed.

Another object of the invention is to provide an improved conduit which may be readily and economically produced.

Another object of the invention is to provide an improved conduit which may be easily handled.

Another object of the invention is to provide an improved conduit which may be easily installed.

Another object of the invention is to provide an improved conduit which will effectively support pipes or the like within it.

Another object of the invention is to provide an improved conduit which will be relatively strong and light.

Another object of the invention is to provide an improved conduit in which all metal parts will be electrically insulated from the ground and thus will prevent electrolysis.

Another object is to provide an improved conduit in which pipe supports may be positively locked in place and/or cemented in position.

Another object is to provide an improved conduit in which the distances between and positions of pipe supports may be varied to meet differing construction conditions.

Another object is to provide an improved conduit which will provide means for the use of simple alignment guides for pipes.

Another object is to provide an improved conduit in which alignment guides or the like may be positively locked and/or cemented in position.

Other objects will hereinafter appear.

The invention will be better understood from the description of one practical embodiment thereof, illustrated in the accompanying drawing, in which;

Figure 1 is a perspective view of the section of tile used in forming the improved conduit;

Figure 2 is a transverse sectional view of a completed conduit taken through the valve end thereof and showing a single pipe installed therein;

Figure 3 is a fragmentary longitudinal sectional view taken on the line III—III of Figure 2; and Figure 4 is a view similar to Figure 2 but showing a plurality of pipes installed in the conduit.

In the installation of pipe lines for conveying either hot or cold fluids, it has been customary to arrange the pipe line in some kind of structure or casing within which heat insulating material may be placed. Frequently the pipe line has been supported upon brackets which have passed through the covering or casing and have rested upon foundations, as of concrete or the like, placed within the ground, and beneath the casing.

In Figure 1 a conduit section is shown consisting of a tubular cylindrical portion, the upper half of which is indicated by the numeral 1, and the lower half by the numeral 2. At one end of the cylindrical casing an enlarged cylindrical portion or bell is provided, which will be more fully described hereinafter.

Along the sides of the casing on its exterior at each side are two projecting flanges or ribs 3 and 4, and within these ribs are grooves or scorings 5, which facilitate the splitting of the upper and lower halves from each other, as at 6, prior to insulation. The flanges are adapted to receive between them a strip of mortar 7, cement or the like, by which the halves of the section are sealed and keyed together.

The smaller end 8 of the section is shown as provided on its exterior with a plurality of grooves 9. This end is adapted to be received within the enlarged cylindrical flange 10 of the bell end of the adjacent section, which flange, on its interior, is provided with annular grooves 11, the grooves in the bell and on the reduced end serving to permit mortar 12, cement or the like inserted between these ends, to seal and lock the same together.

Immediately within the cylindrical bell flange 10, the internal dimensions of the tile section are reduced nearly to the internal diameter of the tubular portion of the section, but the internal surface, instead of being cylindrical, consists of a plurality of mutually perpendicular or stepped surfaces 13 and 14. These perpendicular or step-like surfaces terminate at two planes normal to the axis of the section, one of which 15 intersects the interior cylindrical surface 16 of the elongated portion of this section, and the other of which 17 intersects the internal surface of the bell end thereof.

The stepped surfaces lie entirely between the projection of the inner cylindrical surface of the elongated portion of the section and the projection of the exterior cylindrical surface thereof. Thus, when the smaller end of an adjacent section is inserted within the bell, its inward motion is limited by encountering the first plane surface 17, so that it cannot enter it within the space bounded by the stepped surfaces 13 and 14.

On installation, supports for the pipes and the like to be laid within the casing may be very conveniently arranged by placing transverse bars 18 across opposed steps 14, and supporting upon these bars rollers 19 or other pipe carrying means, upon which the pipe 20 rests, as clearly indicated in Figures 2 and 3. As shown by these figures, a single bar and roller may be used where only one pipe is to be inclosed within the casing, and this pipe positioned coaxially with the casing.

If, however, it is desired to include a plurality of pipes, one or more bars 18a and 18b may be arranged in any desired manner, to support different pipes 20a, 20b, and 20c within the casing, each being supported by a roller 19a as indicated in Figure 3.

A smaller or spigot end of the adjacent section firmly locks the bars 19 within the recesses formed by their respective steps, and the two section ends are effectively sealed together as is customary with ordinary belled and spigot tile pipes by the use of mortar, cement, or the like.

The weight of the pipe lines is effectively transmitted to the ground, base drain, or other support upon which the casing sections rest, and no need exists for passing any support through the casing. This, of course, eliminates the necessity of sealing the space about an opening through which a support has been passed, or the possibility of leakage through such opening.

Other types of pipe support such, for instance, as shown in my prior Patents Numbers 1,991,455 and 2,005,699, might be used, or, if it is desired to locate baffles or any other article within the casing, the steps may be conveniently used for this purpose.

Alignment guides such as shown in the application of McLeish and myself, Serial Number 662,770, Patent No. 2,050,968, may also conveniently be placed within the belled ends of the pipes, and may be provided with lugs which will seat on the steps therein. These guides, if desired, may be secured in position by cement or the like.

Also, a layer of flat sheets or plates, such as of tile, may be laid across some of the lower steps, to support the heat insulating material and provide, in the bottom of the pipe, a drainage passage.

The steps are symmetrically arranged so that it is immaterial which half of the section be used for the upper and which for the lower part. Their symmetrical arrangement likewise produces a substantially uniform distribution of material and so precludes any tendency toward warpage or other distortional effects, when made of ceramic material, upon drying and firing. The steps, moreover, eliminate some of the material within the bell section without substantially increasing its exterior dimensions and so lighten the weight of this section, without in any way impairing its strength.

While I have described the illustrated embodiment of my invention in some particularity, obviously many other embodiments, variations, and modifications will readily occur to those skilled in this art, and I do not therefore limit myself to the precise details shown and described, but claim as my invention all embodiments, variations, and modifications coming within the scope of the subjoined claims.

I claim:

1. A conduit consisting of a plurality of bell and spigot sections sealed together, a pipe within said conduit, and supports for said pipe carried upon horizontal steps formed in the interior surface of the bell portion of the sections.

2. A conduit consisting of a plurality of ceramic bell and spigot sections sealed together in end to end relation, the conduit both interiorly and exteriorly throughout the majority of its extent being of generally cylindrical shape, whereby excessive distortion of the sections during firing is eliminated, and having throughout a minority of its extent internal spaced integrally formed support receiving means, pipe supports resting upon said support receiving means, and a pipe extending through said conduit and resting upon said pipe and support.

3. A bell and spigot ceramic conduit section of generally cylindrical shape both interiorly and exteriorly throughout the majority of its extent, whereby excessive distortion of the section during firing is eliminated, and having integrally formed internal support receiving means deviating from said generally cylindrical shape throughout a minority of its extent.

CHRISTIAN GOTTWALD.